Jan. 29, 1963  J. B. ARGABRITE ETAL  3,075,297
APPARATUS FOR PROCESSING LEATHER
Filed Oct. 27, 1958  7 Sheets-Sheet 1
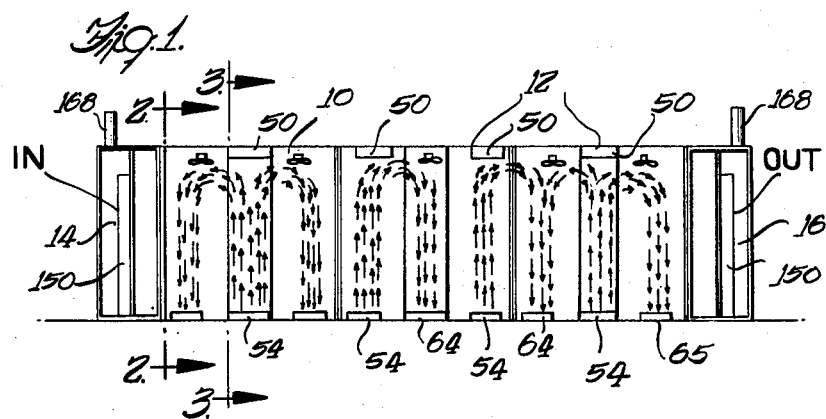
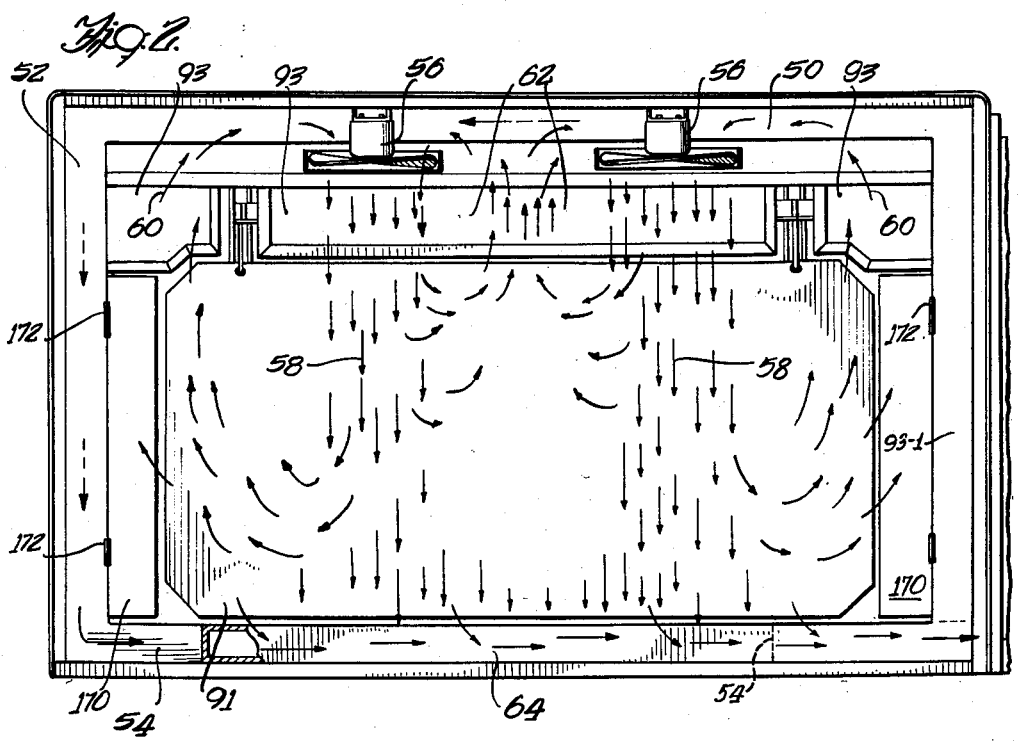
Inventors
Joseph B. Argabrite
Earl R. Van Alsburg
Attorney

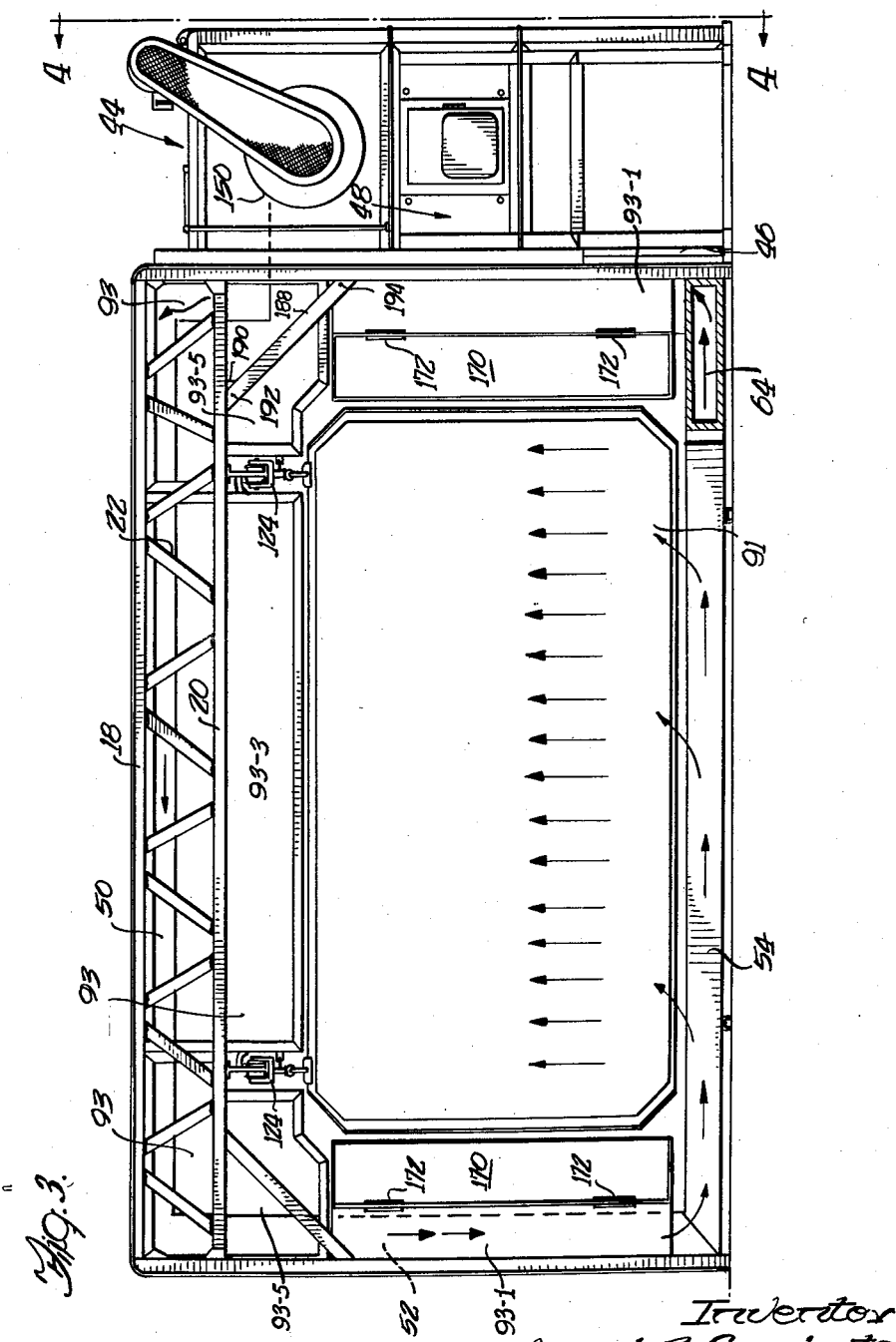

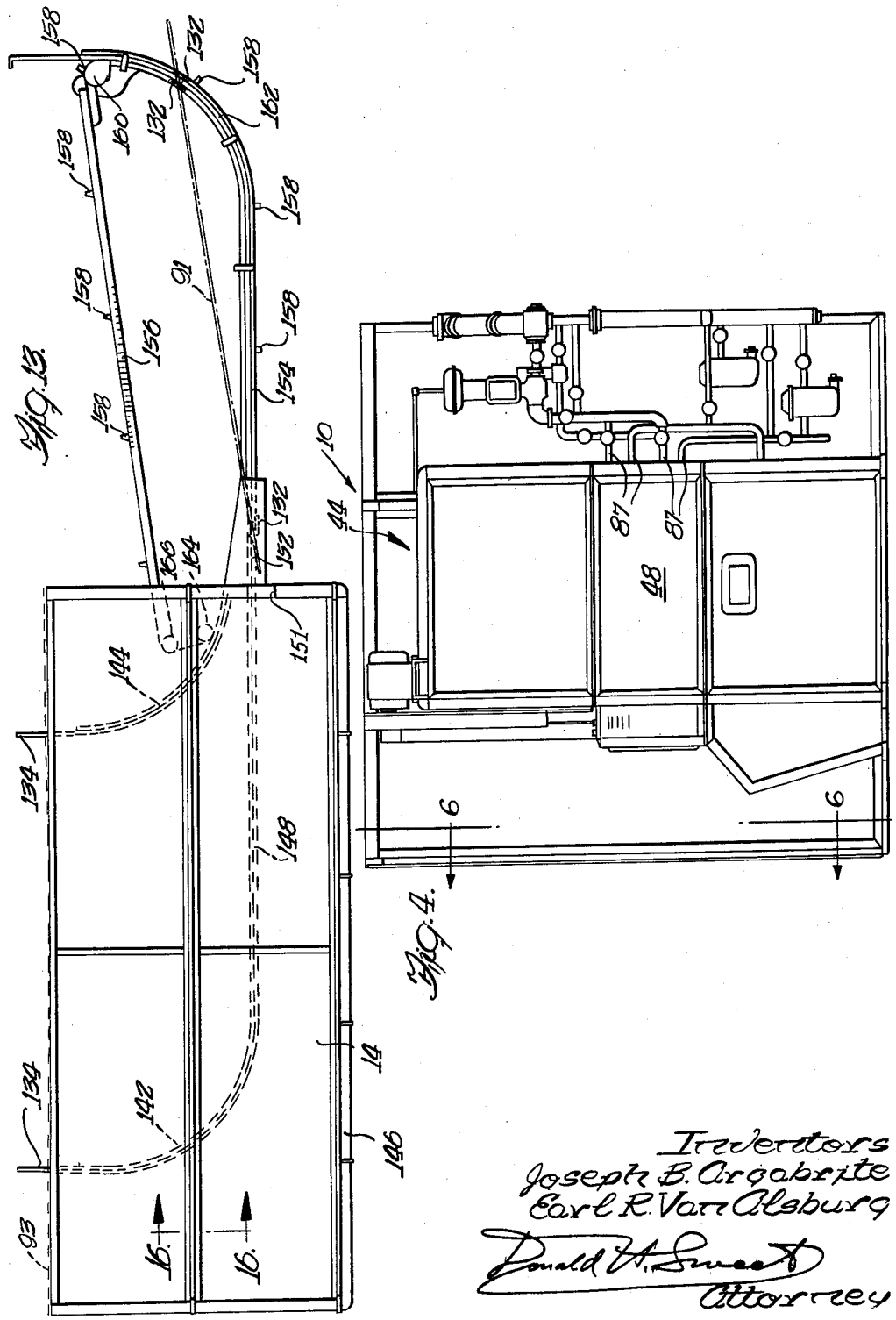

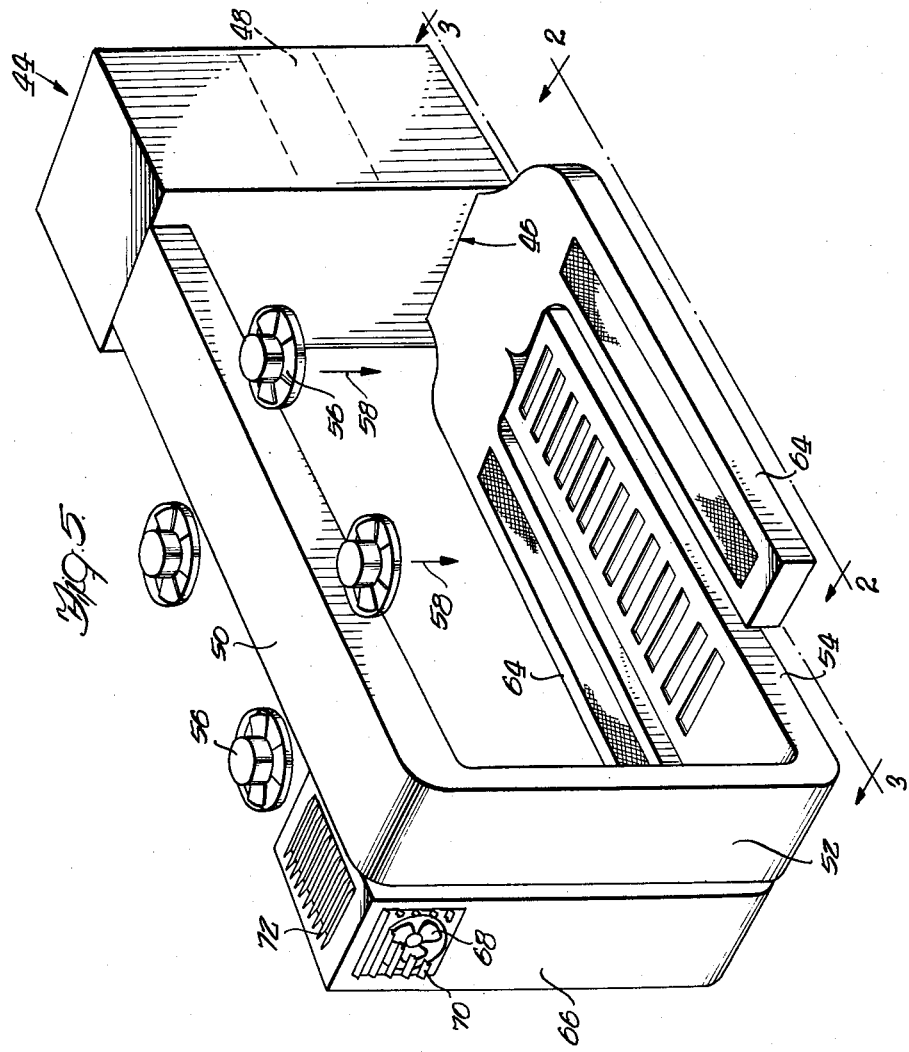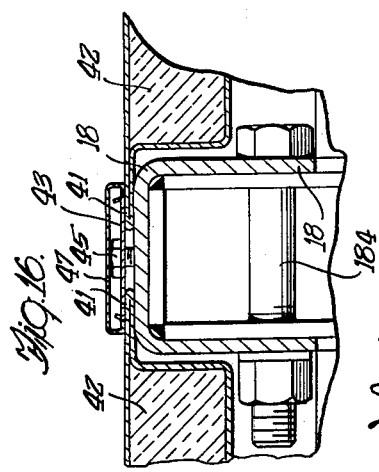

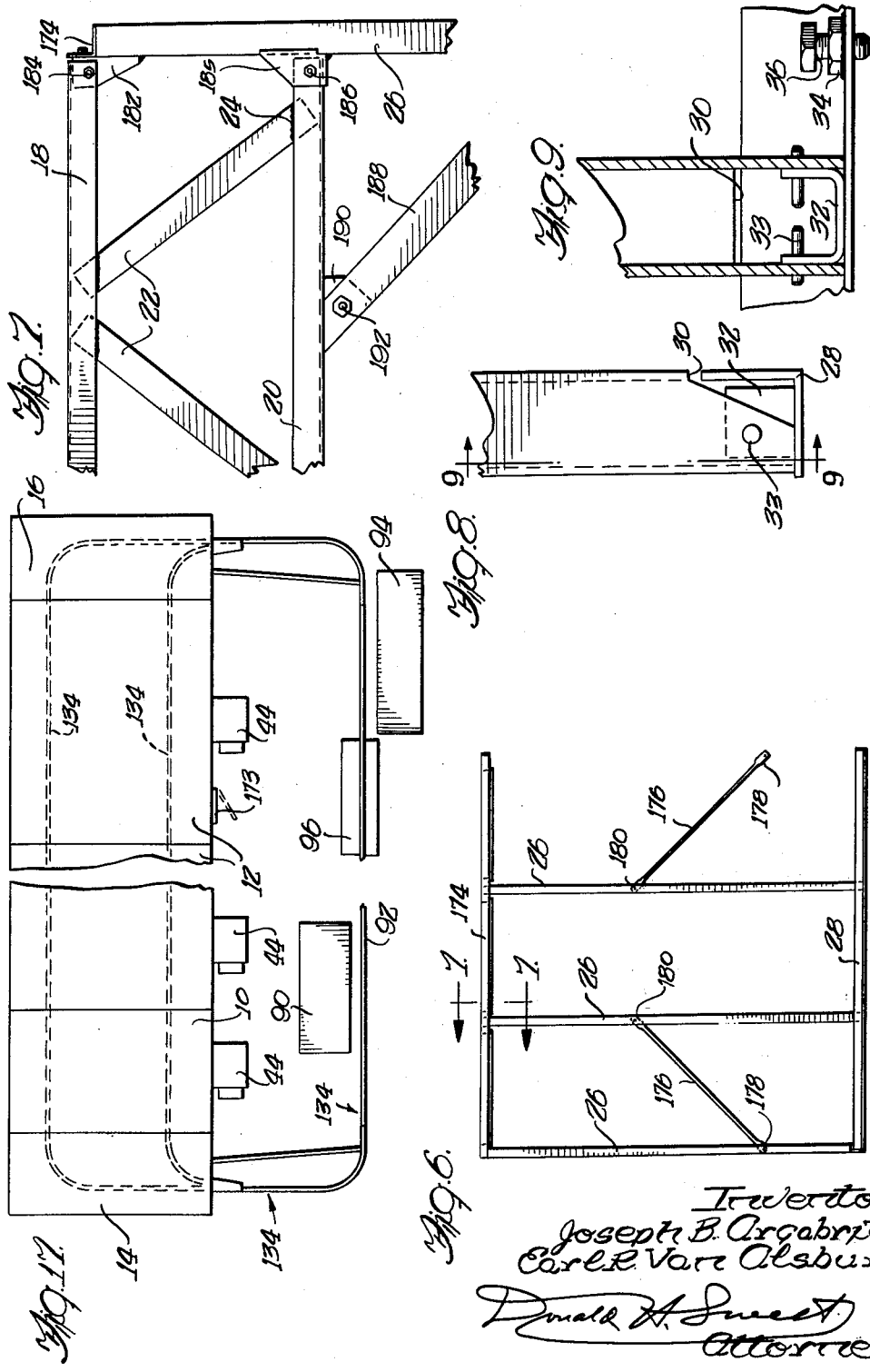

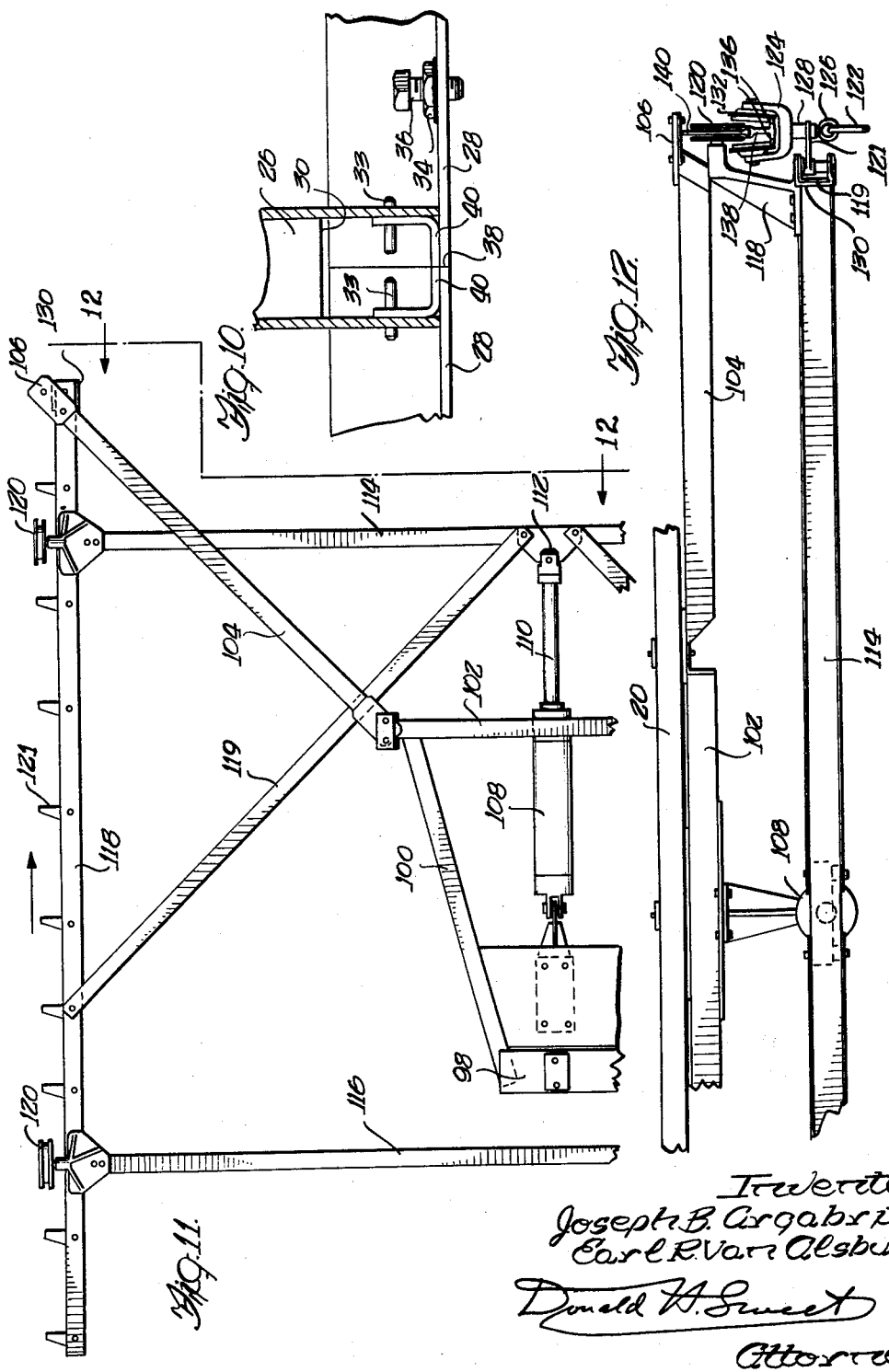

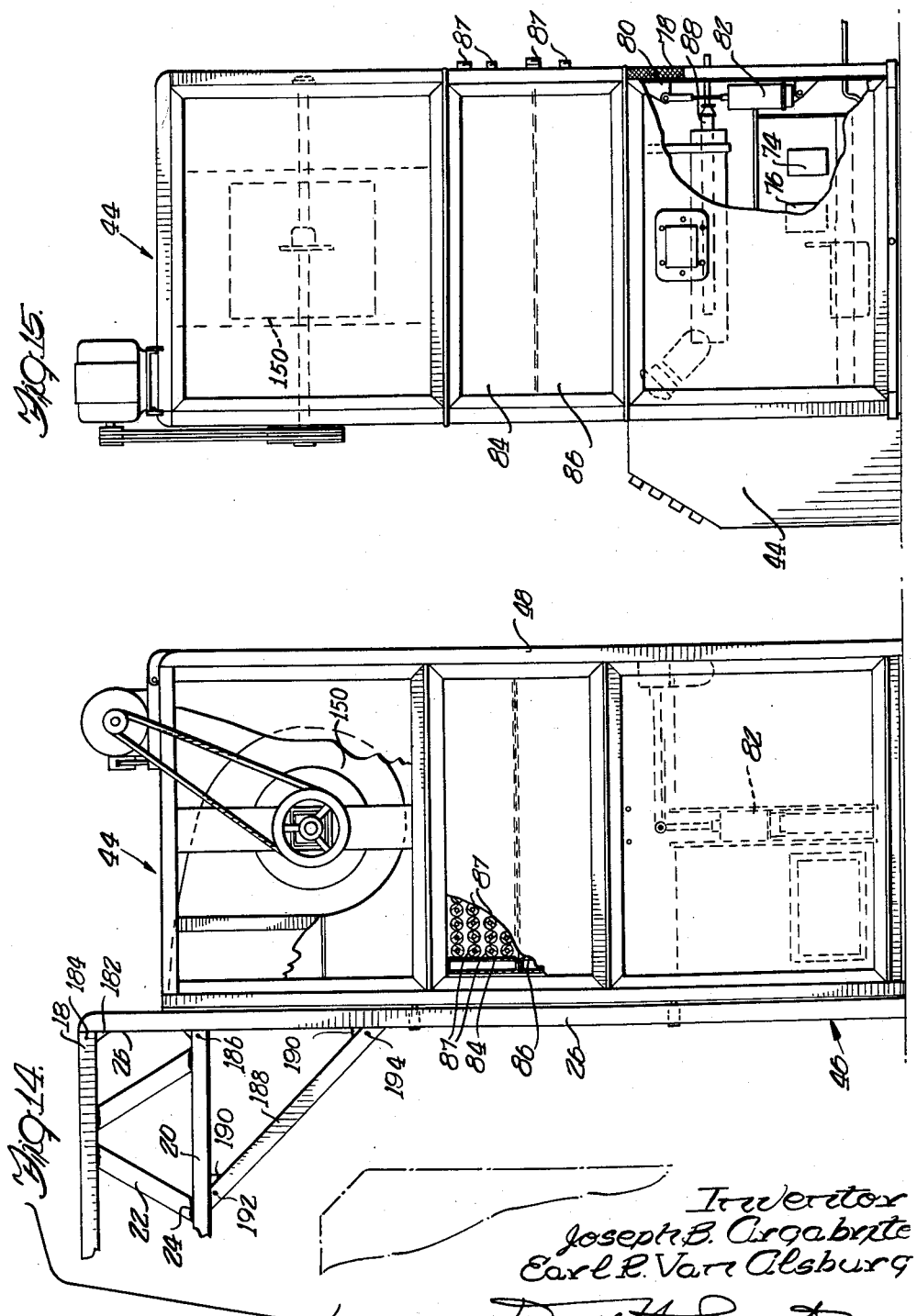

United States Patent Office 3,075,297
Patented Jan. 29, 1963

3,075,297
APPARATUS FOR PROCESSING LEATHER
Joseph B. Argabrite, Palatine, and Earl R. Van Alsburg, Des Plaines, Ill.; said Van Alsburg assignor to said Argabrite
Filed Oct. 27, 1958, Ser. No. 769,886
7 Claims. (Cl. 34—150)

Our invention relates to the processing of leather and analogous wet and porous sheets of material and includes among its objects and advantages ways and means for fabricating driers of a wide variety of sizes and operating characteristics from standardized prefabricated modules and duplicate units. The broad idea of prefabricated sub-assemblies in building structures of many varieties is far from new, but the effective use of such units in tunnel driers in the leather industry has never been achieved, so far as we are aware.

A piece of heavy porous wet leather just after tanning, presents a very unusual problem in drying. The liquids in it include oils, and many other organic compounds emulsified in or dissolved in water, and the individual organic fibers of the leather itself have nearly always been more or less hydrated during the tanning process. These solutions and water of hydration do not volatilize at the temperatures to be expected with ordinary water, and the degree of heat and dryness to which it is possible to subject the outer surfaces of such a piece of leather during the process of letting heat permeate into the body of the material sufficiently to get the moisture out, is a strictly limited and critical matter. Anyone who has attempted to dry out a pair of thoroughly water-soaked leather shoes by laying them on a radiator or hot air register has learned by experience that removal of moisture too rapidly develops the surface layers of the leather into bone-dry, inflexible, brittle material while the middle layers are still uneffected, and practically ruins the shoes for further use. In general, a hide of full thickness from an adult beef animal needs to be subjected to air at much lower temperatures, with the initial humidity of the air before it strikes any leather very carefully adjusted and controlled, and the process of getting the material heated through and the moisture content reduced to the final percentage desired for flexible, serviceable leather is of the order of magnitude of from four to six hours. It is only by an accurate and precise control of both temperature and humidity by experienced personnel, that the tunnel drier has succeeded in replacing the practice of loft drying, where the hides are let stand for a matter of several days or a week or two to achieve the necessary low moisture content and uniformity of moisture content.

It is a fortunate coincidence that many of the specific modifications of the drying process itself to facilitate use of prefabricated units in the drier have been found to be advantageous per se in securing an output of greater uniformity and better quality.

In the accompanying drawings:
FIGURE 1 is an elevational diagram for a typical drier of medium size;
FIGURE 2 is a diagrammatic view of a plate located in downwardly moving air with the positions of some adjacent parts indicated, viewed from the position of line 2—2, of FIGURES 1 and 5;
FIGURE 3 is a diagrammatic view of a plate located in rising air, with the positions of some adjacent parts indicated, viewed from the position of line 3—3, of FIGURES 1 and 5;
FIGURE 4 is a front elevation of one of the units 44 as indicated in FIGURE 3;
FIGURE 5 is a perspective of the arrangement of air ducts for the unit of FIGURE 4, with the positions of the four blowers indicated;
FIGURE 6 is an inside elevation of the wall of the unit of FIGURE 4 remote from the air circulating unit 44;
FIGURE 7 is a detail of one end of the top span of a truss, viewed in the direction indicated by line 7—7 of FIGURE 6;
FIGURE 8 is a detail of the foot of a post;
FIGURE 9 is an inside view of the same foot, in section on line 9—9 of FIGURE 8;
FIGURE 10 is a detail of the post foot at the end of a section;
FIGURE 11 is a partial plan view of a plate feeding carriage;
FIGURE 12 is an end elevation of the parts shown in FIGURE 11, as viewed from line 12—12 of FIGURE 11;
FIGURE 13 is a partly diagrammatic view of the intake section, and the power conveyor for moving the plates into the tunnel;
FIGURE 14 is an end elevation of the power housing for a section, with the housing partly broken away;
FIGURE 15 is a similar view of the same power column on a vertical plane parallel to the tunnel;
FIGURE 16 is a section on line 16—16 of FIGURE 13; and
FIGURE 17 is a small-scale plan layout for a typical installation.

In the embodiment selected to illustrate the invention, the modular unit measures three feet longitudinally of the oven and extends transversely the entire width of the oven, which is 15′3″ in outside dimension, and the entire height of the oven, which is 9′3½″. The drying sections are made up in two sizes. The standard section 10 (see FIGURE 1) includes three modules, and the long section 12 includes six modules. There is also an intake section 14 at one end which includes only two modules, and a delivery section 16 at the other end which includes only two modules.

Each module includes one truss with end posts, and these parts are all assembled from formed angles and channels, rather than structural shapes, for maximum lightness and ease in assembly. Referring for convenience to FIGURES 3 and 4, the top span of each truss includes a top channel 18 opening downwardly and a parallel bottom channel 20 opening upwardly. Twelve diagonal braces 22 are arranged in zig-zag relationship throughout the length of the top span to rigidify this part of the structure. Each diagonal brace is, itself, a formed channel of a size to nest inside the top and bottom channels, after which the edge of the big channel lying pressed against the outer face of the diagonal brace channel is united with it at 24 by weld metal flowed into the rabbet formed at this point.

At each end of the top span the vertical post 26 extends down into abutment with a longitudinal bottom sill 28. The post 26 is a square, hollow tube and the sill is a formed angle with its lower leg horizontal and extending in toward the center of the structure. As best indicated in FIGURES 8 and 9 each post is notched at 30 to clear the upwardly extending vertical leg of the sill 28, but at least half of its bottom end extends down into thrust abutment with the sill 28. Each of the three posts 26 of FIGURE 6 is anchored to the sill by nesting it over a channel-shaped clip 32 and inserting a pin 33 through registering holes in the clip and the post.

Close beside each clip, on either side thereof, we provide a nut 34 laid on the sill and welded in place there and a leveling screw 36 having its head above the horizontal leg of the sill and its adjustment point extending down below the horizontal leg of the sill.

Referring now to FIGURE 10, at the right hand end of the lower sill 28 of FIGURE 6, the sill ends at 38, in abutment with the left end of an adjacent sill 2. At this point two angle clips 40 are substituted for the channel clip 32 of FIGURE 9, and the post 26 of the first module of the next section is fitted down over these angle clips and fastened in place by pins 33 to complete the fastening of the second section to the first section.

The flooring of the buildings in which such tunnels are installed is rarely as perfectly level as might be desired for supporting the tunnel with its entire length in perfect alignment. When installation is in older buildings these discrepancies are more serious.

It will be apparent that we have provided high precision adjustment adjacent the foot of every one of the three-foot modules of the entire tunnel, so that there is no need to attempt previous preparation of the flooring or the installation of a previous sill. The frame work of an entire tunnel can be set up quickly and then a brief session with the multiple adjustment screws can correct all the minor differences in alignment and support. After this has been done it is perfectly possible to leave the assembly unchanged so that subsequent adjustments can be made from time to time, but the customary procedure is to pour a little cement around the lower flange of the tunnel sill.

To complete the enclosure of the tunnel, panels 42 of fiberglass encased in sheet metal may be laid in place along the ceiling and both end walls of each module, and a series of similar panels completes the final end wall at both ends. Any one of the vertical end wall panels of the modules, if omitted, leaves an open space of the correct size and shape to receive and cooperate with the power drying and circulating means 44. This contributes greatly to flexibility. In FIGURE 4 the power unit 44 is indicated as placed at the end of the center module of that section, but whenever irregularities in available floor space make such a location in any way inconvenient, no change in the basic structure is necessary to position this power unit opposite any one of the three modules, or at the opposite end of any module.

As best indicated in FIGURE 16, the panels 42 are simply laid in place, and are not relied on for any structural reinforcement. Therefore, if it becomes necessary to move one of the power units 44 in remodeling the plant for more capacity, the unit 44 and the panel 42 are simply removed from the frame and interchanged, with a few sections of air duct shifted to correspond. Each panel has a peripheral flange 41 clamped against the adjacent frame member 18. A batten 43 is laid over the flanges 41 and fastened with screws 45. Then the screws 45 and batten 43 are covered with a trim batten 47, snapped in place.

The Drying Medium Cycle

Referring now to FIGURE 3, each power unit 44 receives moist spent drying medium at the bottom at 46. This rises through a heating section 48, where its temperature is raised enough to enable it to do additional drying. From the heating section 48, the drying medium passes up through the rotary fan 150, which is the primary circulating means for the entire chamber, and then re-enters the chamber. It passes first across the top of the chamber through a duct 50; then down the far side of the chamber through a duct 52 and then back across the floor of the chamber in a duct which has copious wide openings through which the hot air may rise upward between the plates 91 in the chamber. The plates 91 may be of any conventional type, such as those described in Patent 2,102,667 issued to George M. Argabrite, December 21, 1937. At the top, the upward progress of the stream is arrested by the duct 50 and it splits into two substantially equal portions moving in both directions. This brings each of the separated halves of the stream under the influence of a pair of circulating fans 56. Each of these fans (see FIG. 2) directs a rather powerful downwardly directed jet at 58 and the velocity of this jet is much more than the average velocity of the air stream, so that near the bottom of the chamber the jets are deflected outwardly away from each other and still have sufficient velocity so that an upward current results along the end of the plate and in the air space beyond the end of the plate. This builds up two large vortices in which the air returns toward the ceiling at 60 and moves back toward the fan 56 to receive another impulse. The fans 56 are spaced far enough apart so that there is also developed a considerably smaller double vortex 62, which usually extends down ⅓ or ⅔ across the face of the plate 91 in the center. It will be obvious that the withdrawal of spent drying medium in the return duct 64 underlying each pair of fans 56 will generate a net downward movement of the air mass as a whole. The two streams of spent drying medium in the ducts 64 merge and enter the power unit 44 at 46 and this completes the primary cycle for the drying medium.

It will be obvious that if the circulation just described remained completely closed, it would build up its moisture content to a point such that no further drying could take place. Means are provided for exhausting a minor fraction of the circulating air stream, at the point where its temperature is minimum and its moisture content is maximum, in order to conserve power. One of the return ducts 64 communicates with a vertical riser duct 66 at the end of the duct 64 remote from the power unit. This riser duct 66 is a dead end, so far as chamber circulation is concerned. The duct 66 is enlarged at its upper end to house a dirigible exhause fan 68, which may be set to blow air out through louvers 70 at the rear wall, or through louvers 72 in the top wall. Adjustment of the exhaust fan 68 to exhaust a minor fraction of the total circulation of air will draw into the circulating system enough dry fresh air through grill 78 (see FIGURE 15) to reduce the moisture content of system a little faster than a normal working load builds it up.

It happens that this relationship lends itself to arranging for complete automatic control without any control element of any sort inside the tunnel proper. For instance, in the embodiment of the invention disclosed, the temperature and the moisture content of the gases leaving the tunnel at 46 provide complete criteria for complete automatic control. Furthermore, both controls are of the simple "on-and-off" type and require no highly precise adjustment or attention.

Briefly, the returning stream at 46 impinges on a dry bulb thermometer 74 and a wet bulb thermometer 76 (FIG. 15). In a typical operation the dry bulb thermometer is set to turn the heat on and off with respect to an average control temperature of 140° F. When the temperature gets as low as 138° F. the thermometer operates and the heat is turned on and remains on until the temperature rises to 142° F. when the heat is turned off. The wet bulb thermometer receives the impact of the same returning air stream and is set to operate at 110° F. plus or minus two degrees. When the exhaust fan is not operating and the humidity is rising the cooling action on the wet bulb is decreasing and the wet bulb is getting hotter. This will continue until the wet bulb gets up to 112° F. at which time the fan 68 will start and slowly reduce the moisture content of system until the air at 46 is dry enough to cool the wet bulb down to 108° F., at which point the fan 68 stops automatically and a new cycle of build up starts. The replacement air is conveniently available through a grille 78 (FIG. 15). It is convenient to close this grille by means of a shutter 80, when the fan 68 is not operating, as by means of an air chamber lift 82.

Referring now to FIGURE 1, the long section 12 is 18' long and has three hot air ducts 54 alternating with two return ducts 64, and one exhaust duct 65 in open communication with the adjacent end of a return duct 64. When the exhaust is not operating all the air from the ducts 54 goes back through ducts 64. When the exhaust operates, part of the spent air is sucked in by duct 65.

In all sections the same power unit illustrated in FIGURES 14 and 15 is employed. The basic heating capacity of the power unit may be varied in the ratio of 4 to 1. We have illustrated an upper heating capsule 84 and a lower heating capsule 86, stacked one above the other in the heating section 48. Each of these capsules may be made up with a single set of steam supply tubes 87 or with a double set. Finally, the intermittent turning on and off of the steam heat can easily vary the actual average heat supply in the ratio of 8 or 10 to 1, so that power units otherwise identical provide a wide range of power variation.

The long sections are customarily recommended only for tunnels at least as long as that of FIGURE 1, which is a relatively short tunnel. It is possible to make up a tunnel entirely of long sections, but because getting the paste properly set at the outset is likely to be a problem at least a part of the time in the operation of any plant we prefer to have the section next the receiving section 14 a 9' section so that the first engagement between the freshly set leather and the drying medium will occur during a down pass, where the drying medium is partly spent and moving at a somewhat lower velocity. This also provides the added capacity per foot of travel at the inlet end where the load is greatest.

Under certain circumstances, especially when emptying a drier preparatory to shut down, or in changing from one type of leather to another, it becomes desirable, or even necessary, to pass empty plates through the drier. At such times, the abrupt removal of the drying load is likely to cause the power unit to reduce the moisture content of the circulating system lower than it ought to go, and the abnormally dry air thus stored will have a harmful effect on the first pieces of new leather coming in when the drier is started again. It will be obvious that the temperature of the wet bulb 76 will become abnormally low when the air becomes abnormally dry, and we provide a perforated steam injector pipe 88 for blowing live steam into the circulation just before it meets the heater units 84 and 86. This may advantageously be connected to go into operation whenever the wet bulb 76 arrives at a predetermined abnormally low temperature. Except during brief periods of abnormal operation, or in starting up and shutting down, the humidifier pipe 88 never functions, but it is there to keep the drier properly conditioned for the receipt of the next leather to be dried. Normal control is entirely by stopping and starting the fan 68 with opening and closing of shutter 80. This provides a great heat economy compared with the previous practice of having an exhaust function continuously and intermittently blowing in steam at 88 whenever the fan gets the humidity too low.

Referring now to FIGURES 13 and 17 the complete cycle of operation on the leather includes the affixing of fresh skins from a supply table at 90 to plates 91 suspended from the outer conveyor track at 92; the power delivery of the pasted plates to the receiving section 14; the storage of a substantial number of plates in the receiving section 14 to let the paste set; the withdrawal of the plates from the section 14 into the first drying section 10 and thereafter through a succession of standard sections 10 or long sections 12 of indefinite length; the storage of finished leather on the plates in the delivery section 16 long enough to let the leather and plates cool gradually without subjecting them to such rapid changes in temperature that the leather will detach itself from the plate; the removal of the finished leather to receiving means, such as a supply table 94; the removal of dry paste from the naked plate by washing means located at 96. This completes the cycle and the washed plate is ready to receive more leather from the supply table 90.

Means are provided for pushing the closely spaced plates at intervals step by step through the tunnel and for stopping them at the end of each movement with one of the plates in position to constitute an effective closure of the opening in each of the transverse diaphragms subdividing the tunnel into the succession of separate chambers.

Referring to FIGURES 11 and 12, a stationary frame is suitably affixed to the channels 20. The frame proper is A-shaped with a short cross piece 98 and diagonal side pieces 100 running down to the ends of a longer cross piece 102 affixed to the next channel. The ends of the cross piece 102 are connected to diagonals 104 that extend over to a third bottom channel 20, being fastened to the same at 106.

At the center of the tunnel, offset below the carrying frame, is the stationary cylinder 108 actuating the piston rod 110. This piston rod is suitably connected, as by a gusset plate 112, to the middle of the front axle 114 of a reciprocating carriage. The rear cross piece and axle 116 of the same carriage may be identical in configuration. At each end of each axle we provide an upwardly extending knuckle 118 providing pivotal support on a horizontal transverse axis for the carriage wheel 120. The frame work of the reciprocating carriage is completed by channel-shaped members 119 each housing a plurality of spring held pawls 121, and by diagonal braces 119.

Each plate 91 is suspended by a hook 122 to an upwardly opening yoke 124, and the bolt 126 connecting the hook to the yoke is provided with a sleeve roller 128. The direction of progress of the plates is to the right in FIGURE 11 and the power cylinder 108 is provided only at the exit end of the tunnel. It will be apparent that movement of the carriage to the left from the position of FIGURE 11 will draw the pawls 121 past one or more of the rollers 128, and that subsequent return to the position to FIGURE 11 will cause the pawls to engage the rollers and move them positively through the next increment of motion. As viewed in FIGURE 11, during the power stroke to the right, the pawls are immovable in the position shown and push the sleeves 128 along. During the return stroke to the left, they yield by clockwise rotation caused by contact with the sleeves 128 and pass by the stationary sleeves 128.

In practice, it is convenient to move the plates through increments equal to twice the distance between the plates. Therefore, the stroke of the piston rod 110 is made equal to twice the distance between the plates, plus an additional distance sufficient to allow for the excess motion necessary to carry one of the pawls 121 past a roller 128.

It will be obvious that since the distance moved during each advance stroke of the pawls 121 is always the same, only correct positioning of the parts is needed to have the stationary drying period between successive moves occur with each of the transverse partitions completed by a plate 91 positioned coplanar with the partition.

We provide a complete transverse barrier at the inlet end of each successive chamber. It is substantially complete, except for a central opening just large enough to let a plate 91 pass through. Each barrier comprises rigid vertical side panels 93-1, a rigid top panel 93-3, rigid corner panels 93-5, and narrow swinging doors 170 hinged on the inner edges of the vertical panels 93-1. The panels 93-1 terminate short of the adjacent ends of the plates 91 and the gap is closed by the doors 170, which permits personnel to pass through the tunnel. The air circulates at negligible pressures and in volumes of the order of magnitude of 30,000 cubic feet per minute, so that small cracks, and the small openings to let the yokes 124 pass through, have no material effect. When a plate 91 is positioned exactly in the plane of partition, the partition and plate together constitute a barrier that is effective to keep the main circulation in each chamber substantially independent of that in the adjacent chamber.

The cylinder 108 and associated parts are needed only at the exit end of the tunnel. For each additional 9' of tunnel length throughout the length of the tunnel we provide an additional pawl carriage identical with that shown in FIGURE 11 except that the diagonal braces 119 are omitted. The right end of the pawl channel 118 in FIGURE 11 is shown as provided with a coupling 130, just large enough to telescope over the left end of an adjacent pawl channel far enough to receive the pivot pin for the last pawl of the driving pawl channel. In this way an indefinite number of additional pawl carriages can be hooked up to extend the length of the entire tunnel and the left end of the last pawl carriage will reach past the partition defining the end of the first drying chamber and pick up two plates from storage in the intake section 14.

Each of the yokes 124 carries spaced wheels 132 which ride on the track, indicated as a whole by the reference character 134, FIG. 13. This track is T-shaped with the T inverted, providing bottom flanges 136 for the wheels 132. The stem 138 is connected at suitable intervals to hangers 140 extending down from above and is also supports the wheels 120 of all the pawl carriages. The wheels 120 straddle and ride on the upper edge of the stem 138.

Referring now to FIGURE 13, the straight sections of track 134 extend throughout the length of the drying portion of the tunnel. In the intake section these curve laterally at 142 and 144 and these curved portions are inclined gently upward just enough to cause the fresh plates stored on them to slide down by gravity toward the first transverse partition, where the pawls 121 can get them, two at a time. The curved track portion 142 swings over near the end wall 146 of the intake section 14 and then extends straight across at 148 to the open inlet door at 151. There it registers with a conventional shiftable switch section 152, which is illustrated in FIGURE 13 in alignment with the track section 148, and an outer straight track section 154. One of the plates is indicated at 91, with the wheels 132 of its carriage about midway of the shifting track section 152.

Power means are provided for doing the final pushing of the loaded plate into the intake section 14. We have illustrated a channel guide 156 for an endless chain having spaced pushing lugs 158 at intervals throughout its length. The chain moves to the right in channel 156 and around a drive sprocket at 160 and then passes along under the curved track section 162 and the straight track section 164. At the point of the switch section 152 it deviates and follows diagonally to the curved section 134 for a short distance, up to a guide sprocket 164. It then leaves the track and passes over a second guide sprocket 166 and back into the guide channel 156.

The plate 91 is illustrated with the wheels 132 of its leading carriage midway of the switch section 152 at substantially the point where the lateral deviation of the sprocket chain will bring the pushing lug 158 out of engagement with that carriage and let the plate stop in the position shown. However, the trailing carriage wheels 132 at the other end of the plate have already passed a considerable distance onto the curved track section 162 into a position where the next pushing lug 158, shown rounding the drive sprocket 160, will come along after a short interval and engage the trailing plate carriage to continue the movement of the plate 91. This will push the leading carriage onto the straight track section 148 to go across to the far side of the tunnel. After the leading carriage has left the track section 152 this track section shifts to the other position, where it is in line with the path of the pushing lugs 158. Accordingly, the next pushing lug 158 will push the trailing carriage and the plate, and the plate itself will push the leading carriage off the section 152 and across the straight section 148 to the far side of the oven, and the pushing action will continue while the trailing carriage moves over the shifted track section 152 and onto the curved portion 144 as far as the sprocket 164. At this point the pushing lug will deviate and stop pushing the trailing carriage, but the plate and both carriages have been pushed over the hump and are on the downwardly inclined curved portions 142 and 144 where they will slide forward until they engage the next preceding plate carriages and come to rest.

The track section 152 shifts automatically. Such automatic switches are old and well known in the switching art, and per se form no part of the present invention, and this description has not been encumbered with the details thereof.

It will be apparent that the storage of fresh plates on the inclined track sections 142 and 144 accomplishes two functions. First, the fresh paste is given a considerable time interval to harden and set before the plate is subjected to the action of the first drying chamber. Second, if the pasting operation at table 90 should happen to be interrupted for a few minutes by shortage of paste or by the illness of one of the operators, the storage available in the intake section will take care of any such brief interruption and after the pasting is resumed the operators can catch up in a short time. Similarly, in the delivery section 16 the finished plates are preferably allowed to accumulate and remain for some time before the operators pull them out to remove the finished leather. This not only provides a little leeway for the timing of the actions of the operators at this point, but normally allows the plates and leather to cool slowly for 10 or 20 minutes. Occasionally, abrupt withdrawal from a very hot oven into room temperature will result in differential thermal contraction of the plate and the leather, and accomplish the final detachment from the leather from the plate so that the leather falls on the floor. This is not frequent, but the tempering process during storage in the delivery section makes it even less frequent.

Both the intake section 14 and the delivery section 16 have the simple openings where the plates move through, without any closure or seal at all. Because all the drying chambers 10 and 12 are completely partitioned off, this involves no material loss of heat. The walls of the intake chamber and delivery chamber adjacent the drying chambers will be warmer than room temperature and this source of heat may result in a gentle small current of warm air issuing at the top of the door opening. Even this can be eliminated by a short vertical stack 168 (see FIGURE 1) in the roof of each of the sections 14 and 16, but except in tropical climates, where comfort to personnel may be involved, such stacks are omitted as unnecessary.

It has been pointed out that control of the drying operation involves no control elements inside the tunnel so that access to the inside is hardly ever necessary. However, at relatively infrequent intervals, for repair or inspection or removal of a piece of leather that has accidentally fallen off its plate, it does become necessary for personnel to go inside the tunnel. Referring to FIGURE 2 we have indicated pivoted portions 170 hinged at 172 about vertical axes, and normally forming part of the transverse partition at the incoming end of each drying chamber. These can be pushed aside by operating personnel to enable them to walk along the tunnel beside the ends of the plates in the tunnel whenever the need arises. In very long driers, it is a simple matter to have any of the panels 42 provided with a local access door 173, FIG. 17 to reduce the distance to be traveled.

Starting and stopping the operation of such a drier exposes the frame of the tunnel to rather wide and rapid changes in temperature. Referring to FIGURE 6, it will be apparent that the posts 26 and the top and bottom sills 174 and 28 constitute a series of rectangular frames of very little rigidity with respect to warping out of alignment into a parallelogram that is not exactly rectangular. We have indicated two diagonal braces 176 connected between adjacent posts but these braces do not connect direct to any one of the corners of the rectangle with which they are associated. If they did run direct to the corners of the rectangles, they would render the frame work so rigid that rapid temperature changes would set up harmful stresses. By connecting them to intermediate points at 178 and 180 thermal expansion is permitted to warp the structure a little, resisted by flexure of the posts with forces ample to prevent any harmful warping, but not heavy enough to overload the frame members, or rupture the corner fastenings.

For convenience in shipment the posts 26 are detachably connected to the ends of the top span. This permits the posts 26 and panels 42 and top spans, to be combined into convenient compact packages and crates. Referring to FIGURES 6 and 7 the channel 18 abuts the top sill 174, and a U-shaped clip 182 is welded to the post 26 and extends above the end of the post, to nest inside the top channel 18, and the bolt 184 is for assembly.

A wider clip 185 is affixed by welding to the post 26 in position to receive the end of the lower channel 20 inside the clip, fastened by bolt 186. Finally the diagonal brace 188 fits outside duplicate U-shaped clips 190 welded to the post 26 and the bottom channel 20, and is fastened by bolts 192 and 194, FIG. 14.

All the bolts, 184, 186, 192 and 194 go in holes which, conventionally, are about 60 thousandths of an inch larger than the bolt diameter. This permits the section crew to shift the bottom end of the post enough to get correct adjustment with the bottom sill 28, before tightening the four top bolts.

Others may readily adapt the invention for use under various conditions of service by employing one or more of the novel features disclosed, or equivalents thereof. As at present advised, with respect to the apparent scope of our invention, we desire to claim the following subject matter:

1. Leather drying equipment comprising, in combination: a tunnel; a multiplicity of pasting plates; conveyor means for moving said plates in parallel relationship through said tunnel; each plate lying in a vertical plane normal to the longitudinal dimension of said tunnel; a plurality of transverse partitions spaced along said tunnel and lying in planes normal to the longitudinal dimension of said tunnel; each partition having a central opening barely sufficient to permit passage of a plate; said central opening conforming to the contour of said plate; said plates being closely spaced along their path of movement, whereby, when a plate is coplanar with a partition, the cracks between the plate edges and the adjacent edges of said partition openings are small enough to define a series of effectively separate chambers; an independent powered unit for each chamber, including heating means, circulating means for delivering hot, relatively dry air to said chamber and receiving moist spent air from said chamber and returning it to said heating means, and control means for adjusting and readjusting the moisture content and temperature of the hot air, and the amount of recirculation of spent air; the structure of each chamber including the floor and top and side walls of said tunnel, and one transverse partition; the other partition completing said chamber being part of the structure of the next, juxtaposed, chamber; a plurality of said chambers and their powered units being duplicates of each other; an inlet chamber at one end of said tunnel; an outlet chamber at the other end of said tunnel; said conveyor means including means in said outlet chamber for separating said plates; said inlet and outlet end chambers being each segregated from the adjacent drying chamber by one of said transverse partitions; said end chambers being devoid of circulating means and normally filled with relatively stagnant air; whereby sealing means where said plates enter or leave said end chambers is unnecessary; and actuating means for causing said conveyor to move step by step, with stationary intervening periods during which each partition has a plate coplanar with it.

2. Leather drying equipment comprising, in combination: a tunnel: a multiplicity of pasting plates; conveyor means for moving said plates in parallel relationship through said tunnel; each plate lying in a vertical plane normal to the longitudinal dimension of said tunnel; a plurality of transverse partitions spaced along said tunnel and lying in planes normal to the longitudinal dimension of said tunnel; each partition having a central opening barely sufficient to permit passage of a plate; said central opening conforming to the contour of said plate; whereby, when each partition has a plate coplanar with it, said partitions and coplanar plates define a series of effectively separate chambers; and an independent powered unit for each chamber, including heating means, circulating means for delivering hot, relatively dry air to said chamber and receiving moist spent air from said chamber and returning it to said heating means, and control means for adjusting and readjusting the moisture content and temperature of the hot air, and the amount of recirculation of spent air; certain of said chambers and associated power units being duplicates of each other; and actuating means for causing said conveyor to move step by step, with stationary intervening periods during which each partition has a plate coplanar with it.

3. Leather drying equipment comprising, in combination: a tunnel; a multiplicity of pasting plates; conveyor means for moving said plates intermittently step by step in parallel relationship through said tunnel; each plate lying in a vertical plane normal to the longitudinal dimension of said tunnel; a plurality of transverse partitions spaced along said tunnel and lying in planes normal to the longitudinal dimension of said tunnel; each partition having a central opening barely sufficient to permit passage of a plate; said central opening conforming to the contour of said plate; said plates being closely spaced along their path of movement, whereby, when a partition has a plate coplanar with it, the cracks between the plate edges and the adjacent edges of said partition openings are small enough to define a series of effectively separate chambers; an independent, powered circulating unit for each chamber for drying the plates passing therethrough; and actuating means for causing said conveyor to move step by step, with stationary intervening periods during which each partition has a plate coplanar with it.

4. Leather drying equipment comprising in combination: a tunnel; conveyor means for moving through said tunnel from end to end a multiplicity of plates carrying moist leather to be dried; said plates being held side by side in closely spaced parallel vertical planes normal to the tunnel axis; said tunnel having a cross section materially greater than the size of one plate and leaving a clearance space around said plates; said clearance space extending across above said plates and down outside both ends thereof; transverse partitions, substantially complete except for a central opening to receive and pass said plates; said partitions, when said central openings are occupied by plates coplanar with said partitions, cooperating with said coplanar plates to subdivide a major central portion of said tunnel into a plurality of substantially segregated chambers for circulation of gaseous drying fluids; individually controlled automatic power drying means associated with each chamber and individually adjustable to circulate in said chamber a drying medium of preselected temperature and moisture characteristics; and actuating means for causing said conveyor to move step by step, with stationary intervening periods during which each partition has a plate coplanar with it.

5. A combination according to claim 4 in which said automatic power drying means is completely outside said chamber; and in which automatic control means are provided responsive solely to the temperature and moisture characteristics of the gases issuing from said chamber; whereby access to said chamber is unnecessary during normal operation.

6. A combination according to claim 4 in which the vertical end legs of each transverse partition include a hinged leaf normally held in the plane of the partition and resiliently yieldable to permit operating personnel to pass into and through said tunnel on occasion.

7. Leather drying equipment comprising, in combination: a tunnel; conveyor means for moving through said tunnel from end to end a multiplicity of plates carrying moist leather to be dried; said plates being held side by side in closely spaced parallel vertical planes normal to the tunnel axis; said tunnel having a cross section materially greater than the size of one plate and leaving a clearance space adjacent said plates; transverse partitions, substantially complete except for a closely fitting opening to receive and pass said plates; said partitions, when said openings are occupied by plates coplanar with said partitions, cooperating with said coplanar plates to subdivide a major portion of said tunnel into a plurality of substantially segregated chambers for circulation of gaseous drying fluids; power drying means associated with said chambers and adjustable to circulate in each individual chamber a drying medium of preselected temperature and moisture characteristics, adapted to the condition of the leather in that chamber; and actuating means for causing said conveyor to move step by step, with stationary intervening periods during which each partition has a plate coplanar with it.

References Cited in the file of this patent

UNITED STATES PATENTS

| | | |
|---|---|---|
| 799,322 | Gery | Sept. 12, 1905 |
| 1,888,573 | Sadwith | Nov. 22, 1932 |
| 2,102,667 | Argabrite | Dec. 21, 1937 |
| 2,119,541 | Joy | June 7, 1938 |
| 2,124,242 | Belman | July 19, 1938 |
| 2,152,312 | Jennings et al. | Mar. 28, 1939 |
| 2,347,109 | Hurxthal | Apr. 18, 1944 |
| 2,362,847 | O'Neil | Nov. 14, 1944 |
| 2,370,422 | Reed | Feb. 27, 1945 |
| 2,575,914 | Griffin et al. | Nov. 20, 1951 |
| 2,600,294 | Henry | June 10, 1952 |
| 2,668,366 | Barnett | Feb. 9, 1954 |
| 2,679,699 | Linderoth et al. | June 1, 1954 |
| 2,830,715 | Oholm | Apr. 15, 1958 |

FOREIGN PATENTS

| | | |
|---|---|---|
| 371,869 | Germany | Mar. 22, 1923 |